Sept. 19, 1961   C. C. BAUERLEIN   3,000,607
PNEUMATICALLY CONTROLLED DIAPHRAGM SHUT OFF VALVE
Filed April 15, 1958   2 Sheets-Sheet 1

Inventor
Carl C. Bauerlein

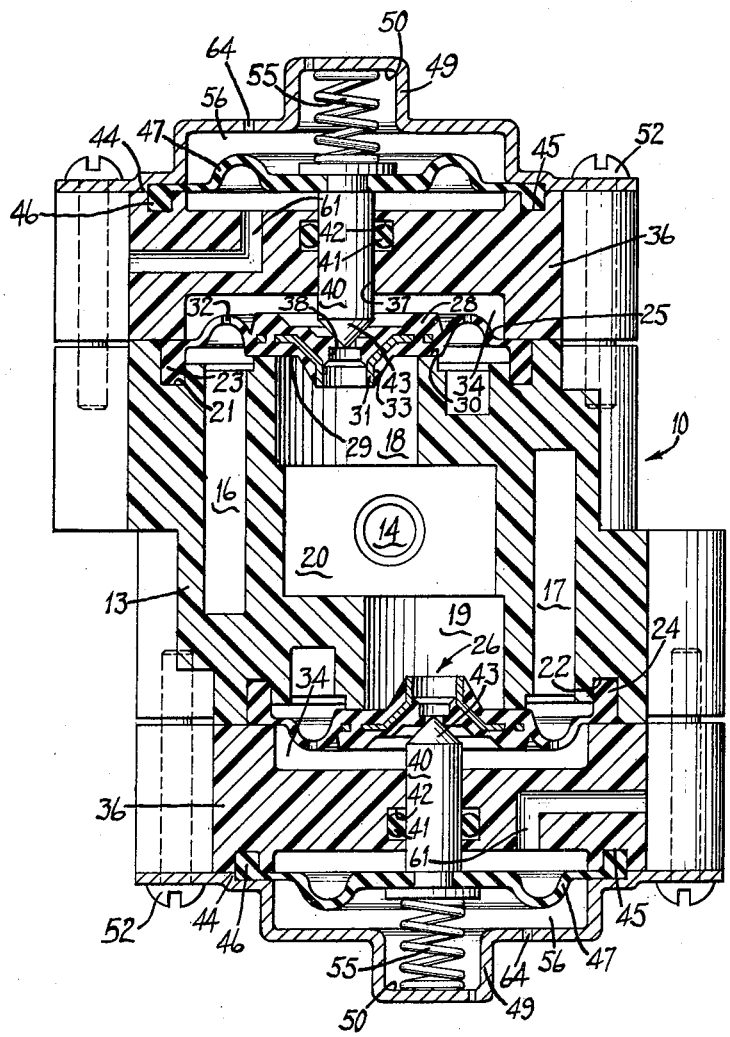

United States Patent Office 3,000,607
Patented Sept. 19, 1961

3,000,607
PNEUMATICALLY CONTROLLED DIAPHRAGM
SHUT OFF VALVE
Carl C. Bauerlein, Lincolnwood, Ill., assignor to The
Dole Valve Company, Morton Grove, Ill., a corporation of Illinois
Filed Apr. 15, 1958, Ser. No. 728,578
1 Claim. (Cl. 251—28)

This invention relates to fluid control valves and more particularly relates to an improved means for controlling the operation of a pilot operated diaphragm valve.

As is well known in the art, pilot operated diaphragm valves are utilized for controlling the flow of fluid through a port and are actuated by fluid pressure differential across the diaphragm. Valve bodies constructed to accommodate these valves are generally constructed with an annular fluid inlet which opens to one side of the valve body and which has an annular fluid outlet port formed concentrically therewith and interiorly thereof which defines a valve seat. The diaphragm valve is mounted on the open end of the valve body and is cooperable with the valve seat to control the flow of fluid from the fluid inlet to the fluid outlet port in the following manner: The diaphragm valve has a bleed hole or bleed holes formed in the periphery of the valve member which communicate fluid in the annular fluid inlet to a chamber lying above the lateral surface of the diaphragm valve. A central fluid passageway is formed within the diaphragm valve member and communicates the chamber above the lateral surface of the diaphragm valve member with the fluid outlet port so that when the central fluid passageway is open, fluid will flow from the upper chamber through the fluid passageway to the outlet port. Since the bleed hole or holes have a combined flow passage area which is considerably smaller than that of the central passageway, fluid will flow through the central passageway to the outlet port from the upper chamber faster than fluid will flow from the annular inlet passage to the upper chamber so that a differential fluid pressure is created across the diaphragm causing the pressure of the fluid in the annular inlet passage to unseat the diaphragm valve to thereby directly intercommunicate the annular fluid inlet with the central fluid outlet port.

A pilot is generally provided in the valve body and is arranged to be cooperable with the central fluid flow passageway within the diaphragm valve member to control fluid flow therethrough and is normally biased into engagement with the diaphragm valve member by a spring or the like to close communication between the upper chamber and the fluid outlet port to permit fluid pressure to build up in the region above the diaphragm which exceeds that below so that the diaphragm valve member will move into engagement with the annular seat defining the outlet port to close communication between the annular fluid inlet and the fluid outlet port.

It has heretofore been the practice to provide a solenoid for effecting retractable movement of the pilot but since solenoid control units are relatively expensive and, due to their complexity, prone to mechanical failure, it is obviously desirable to provide an alternate, less expensive, means for actuating the pilot valve which is of relatively simple design.

Accordingly, applicant has devised a simple, inexpensive, readily assembled pneumatic control means for completely controlling the actuation of the pilot which has the advantageous characteristics of simplicity and inexpensiveness.

Applicant has provided a device wherein an air diaphragm is connected to the armature, at its upper end portion, and wherein a means is provided for directing air to the underside of the diaphragm to retractably move the armature with respect to the pilot controlled diaphragm valve against the force of a biasing medium.

It will further be apparent from the specification which follows that the device is so constructed that either air pressure or vacuum means may be utilized for controlling the movement of the armature. While applicant's preferred embodiment of the invention specifically illustrates a device wherein air pressure is directed to the underside of the diaphragm connected to the armature, it may be found advantageous to provide a means for controllably evacuating the chamber above this diaphragm to effect the retractable movement of the armature with respect to the pilot operated diaphragm valve.

Obviously, whichever pneumatic means is used for controlling the movement of the armature, it will be necessary to provide an atmospheric bleed on the opposite side of the diaphragm connected to the armature from that side of the diaphragm in which the pneumatic control chamber is located. Accordingly, it may be found advantageous to provide a connecting nipple at the atmospheric bleed so that the valve may readily be used with either a vacuum or air pressure control system interchangeably.

It is, therefore, a principal object of this invention to provide pneumatic control means for a diaphragm shut off valve.

It is another object of this invention to provide a pneumatically operated mechanism for controlling the actuation of a diaphragm shut off valve of the type above described which may be controlled by either a vacuum or an air pressure means.

A still further object of this invention is to provide a mechanism for controlling the actuation of a diaphragm shut off valve of the type above described wherein a second diaphragm is connected to the controlling armature and wherein pneumatic means are utilized for effecting movement of the second diaphragm and the armature to which it is connected.

These and other objects of the invention will appear from time to time as the following specification proceeds and with reference to the accompanying drawings, wherein:

FIGURE 3 is a vertical sectional view through the valve structure illustrated in FIGURE 1 and showing the pneumatic control mechanism for controlling the actuation of a diaphragm shut off valve which has been constructed in accordance with the principles of the present invention.

Figure 1:
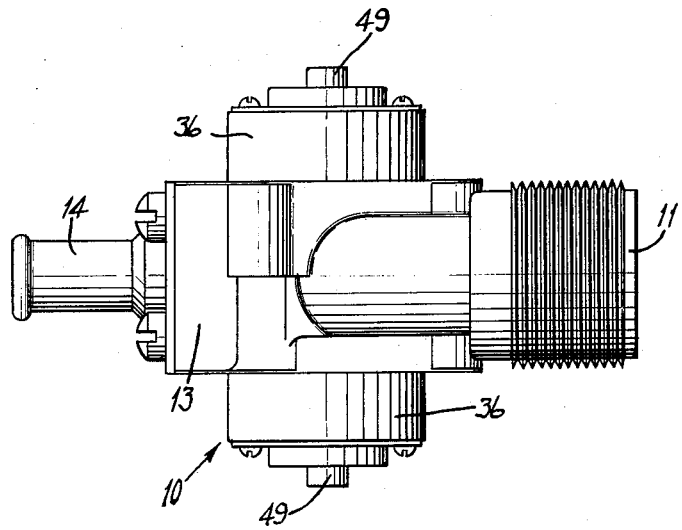
FIGURE 1 is a side elevational view of a valve constructed in accordance with the principles of the present invention.
Figure 2:
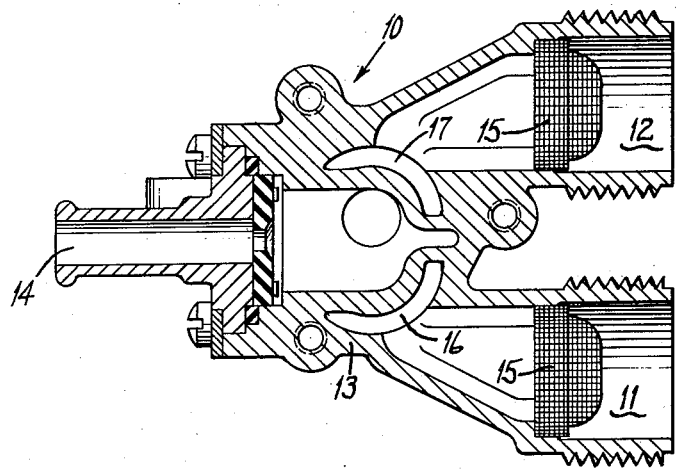
FIGURE 2 is a horizontal sectional view through the valve structure illustrated in FIGURE 1.

In the embodiment of the invention illustrated in the drawings, there is shown a mixing valve 10 having hot and cold fluid inlets 11 and 12, respectively, leading into the valve body 13 thereof and having an outlet 14 leading therefrom.

The inlets 11 and 12 are each shown as having filter screens 15 therein for filtering out foreign particles which may be present in the fluid flowing to the valve and as leading to annular fluid passageways 16 and 17 which open to opposite sides of the valve body 13.

A pair of fluid ports 18 and 19 open to opposite sides of the valve body 13 and are formed concentrically with and interiorly of the annular fluid passages 16 and 17, respectively, and open to a mixing chamber 20 which, in turn, is communicable with the outlet 14 from the valve body.

Annular grooves 21 and 22 are provided at each open end of the valve body to receive annular depending lips 23 and 24 of a pair of identical pilot operated annular diaphragm valves 25 and 26. Since the diaphragm valve actuating means are identical for each of the diaphragm valves 25 and 26, it will suffice to give a complete description of the hot fluid diaphragm control valve 25.

The diaphragm valve 25 is preferably formed from rubber, an elastomer, or other like resilient material and has a thickened central portion 28, an inner face 29 of which is engageable with an annular seat 30 extending around the port 18 to block the flow of fluid from the annular passage 16 to the outlet 14. The thickened central portion 28 of the diaphragm valve 25 is further shown as having a flanged metal insert 31 molded therein for reenforcing the same. The metallic insert 31 within the thickened portion 28 of the diaphragm valve 25 is further shown as having a tubular portion 33 projecting from the face 29 of the valve which forms a passageway member concentric with a central passageway 38 leading through the diaphragm valve.

The diaphragm valve 25 is also provided with a bleeder passageway 32 through the relatively thin walls of the diaphragm valve 25 outwardly of the thickened portion 28 thereof which leads from the annular passage 16 to a diaphragm chamber 34 formed between the upper lateral surface of the diaphragm valve 25 and the inner annular surface of an end closure cap 36 which has a centrally located aperture 37 therein. It is, of course, obvious to those skilled in the art that more than one bleeder passageway may be provided within the diaphragm valve 25 and that the number and size of bleeder passageways governs the speed of valve closing movement and reduces the chances of valve failure due to the presence of foreign materials in the bleed passageways. The total area of the bleeder hole or holes must, however, be less than the area of the central passageway 38.

A pilot 40 is movably positioned within the aperture 37 and is maintained in fluid tight relation with the walls thereof by means of an O-ring 41 which is received in a suitable annular channel 42. The pilot 40 has a valve portion 43 formed integrally therewith on the outer end thereof which is cooperable with the passageway 38 to control the flow of fluid therethrough.

As has been hereinbefore explained, when the valve portion 43 is moved downwardly into engagement with the walls of the passageway 38 fluid enters the diaphragm chamber 34 from the annular passageway 16 through the bleed passageway 32 to thus equalize the pressure acting on each side of the diaphragm valve 25. Since the fluid exposed area above the diaphragm is greater than that below the diaphragm there is a net downward fluid force which maintains the diaphragm closed against seat 30. When, on the other hand, the valve portion 43 of the pilot 40 is moved out of engagement with the end of the passageway 38, fluid will flow out of the upper chamber 34 through the central passageway 38 faster than fluid can flow into it through bleeder hole 32 and the fluid pressure force differential will cause the diaphragm valve 25 to open and permit passage of fluid from the annular passageway 16 to the port 18.

The end closure cap 36 has a stepped peripheral edge 44 therearound which is channeled as at 45 to receive an outer depending peripheral lip 46 of a flexible annular diaphragm 47. A stepped end cap 49 having a recessed portion 50 centrally formed therein seats against the outer peripheral edge of the diaphragm 47 to maintain the depending peripheral lip thereof in the annular channel 45 and is secured to the end closure cap 36 by means of bolts 52 which extend through the end cap 49, the end closure cap 36, and into the valve body 13. As shown in the drawings the diaphragm 47 is suitably connected to the pilot 40 to move therewith. A spring member 55 within the spring chamber 56, formed between the upper lateral surface of the diaphragm 47 and the end cap 49, abuts the diaphragm 47 at one end portion and the inner end of the recess 50 of the end cap 49 at its other end portion.

It will be observed that an air passage 61 is formed in the end closure cap 36 and opens to an air chamber 63 which is formed between the lower lateral surface of the diaphragm 47 and the upper annular surface of the end closure cap 36. The air passage 61 terminates at its outer end portion in a connecting nipple 62 to provide a suitable means for connecting an air hose thereto. It will thus become apparent that if the nipple 62 is connected to a controllable source of pressurized air, the diaphragm 47 and the pilot 40 will be moved upwardly against the resistive force of spring member 55 when air under pressure is directed to the air chamber 63. Upon release of the air pressure within the air chamber 63 the spring member 55 will act to return the diaphragm and pilot to the valve closing position illustrated in FIGURE 3.

An atmospheric bleed passage 64 is provided in the end cap 49 as shown in the drawing to prevent any pressure buildup within the spring chamber 56 during actuation of the diaphragm 47. As has hereinbefore been suggested, it may be desirable to provide a connecting nipple at the atmospheric bleed to provide a means for connecting a controllable vacuum source thereto so that the pneumatic pilot control mechanism may be controlled by vacuum rather than by pressurized air. If the device were used in this way, the air passage 61 would serve as the atmospheric bleed and spring chamber 56 would become the pneumatic control chamber.

It will, of course, be herein understood that this embodiment of the invention has been used for illustrative purposes only and that various modifications and variations of the present invention may be effected without departing from the spirit and scope of the novel concepts thereof.

I claim as my invention:

A pneumatically operable valve structure comprising a valve body having concentric inlet and outlet ports opening to one end thereof, a resilient fluid pressure operated diaphragm valve seated on said one end of said valve body and overlying said ports with a portion thereof engageable with a part of the valve body which defines said inlet port to control fluid flow between said ports, a bleed orifice and an enlarged orifice formed within said diaphragm in portions thereof overlying said inlet port and said outlet port respectively, a closure cap having a guide bore formed therein and extending over said diaphragm and sealing the periphery thereof to said valve body, a pilot cooperable with said enlarged orifice to control fluid flow therethrough and guided within said bore, a sealing member carried by said closure cap within said bore and engageable with said pilot, a resilient air diaphragm seated on the opposite surface of said closure cap from said first mentioned diaphragm and connected to said pilot to effect movement of same, and an end cap overlying said air diaphragm and sealing the periphery thereof to said closure cap, compression spring means interposed between said end cap and said air diaphragm, and an air passage communicable with a source of pressurized air formed within said closure cap for selectively supplying air under pressure to the space between said closure cap and said air diaphragm.

References Cited in the file of this patent

UNITED STATES PATENTS

| | | |
|---|---|---|
| 383,426 | Mason | May 22, 1888 |
| 1,197,053 | Nicholson | Sept. 5, 1916 |
| 1,357,837 | Bouvier | Nov. 2, 1920 |
| 2,610,819 | Sutton | Sept. 16, 1952 |
| 2,708,092 | Smith | May 10, 1955 |
| 2,712,324 | Lund | July 5, 1955 |